(12) United States Patent
Uematsu

(10) Patent No.: US 12,463,211 B2
(45) Date of Patent: Nov. 4, 2025

(54) POSITIVE ELECTRODE, NONAQUEOUS ELECTROLYTE ENERGY STORAGE DEVICE, METHOD OF PRODUCING POSITIVE ELECTRODE, AND METHOD OF PRODUCING NONAQUEOUS ELECTROLYTE ENERGY STORAGE DEVICE

(71) Applicant: GS Yuasa International Ltd., Kyoto (JP)

(72) Inventor: Shinya Uematsu, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 521 days.

(21) Appl. No.: 16/761,375

(22) PCT Filed: Nov. 6, 2018

(86) PCT No.: PCT/JP2018/041153
§ 371 (c)(1),
(2) Date: May 4, 2020

(87) PCT Pub. No.: WO2019/093313
PCT Pub. Date: May 16, 2019

(65) Prior Publication Data
US 2020/0350577 A1    Nov. 5, 2020

(30) Foreign Application Priority Data
Nov. 8, 2017 (JP) .................. 2017-215569

(51) Int. Cl.
*H01M 4/525* (2010.01)
*H01M 4/133* (2010.01)
(Continued)

(52) U.S. Cl.
CPC .......... *H01M 4/525* (2013.01); *H01M 4/133* (2013.01); *H01M 10/0525* (2013.01); *H01M 2004/021* (2013.01); *H01M 2004/028* (2013.01)

(58) Field of Classification Search
CPC .. H01M 4/525; H01M 4/133; H01M 10/0525; H01M 2004/021;
(Continued)

(56) References Cited

U.S. PATENT DOCUMENTS

| 6,200,703 B1 | 3/2001 | Kashio et al. |
| 10,644,353 B2 | 5/2020 | Matsuoka et al. |

(Continued)

FOREIGN PATENT DOCUMENTS

| CN | 103891028 A | 6/2014 |
| JP | 6-349495 A | 12/1994 |

(Continued)

OTHER PUBLICATIONS

International Search Report (ISR) dated Jan. 15, 2019 filed in PCT/JP2018/041153.
(Continued)

*Primary Examiner* — Cynthia K Walls
(74) *Attorney, Agent, or Firm* — RANKIN, HILL & CLARK LLP

(57) ABSTRACT

A positive electrode according to one aspect of the present invention is a positive electrode for a nonaqueous electrolyte energy storage device, including a positive composite having a density of 3.1 g/cm$^3$ or more, in which the positive composite contains a positive active material containing nickel and a reducing organic acid. The nonaqueous electrolyte energy storage device according to one aspect of the present invention is a nonaqueous electrolyte energy storage device including the positive electrode.

13 Claims, 2 Drawing Sheets

(51) Int. Cl.
*H01M 10/0525* (2010.01)
*H01M 4/02* (2006.01)

(58) Field of Classification Search
CPC .. H01M 2004/028; H01M 4/131; H01M 4/62; Y02E 60/10; H01G 11/26; H01G 11/46; H01G 11/86
See application file for complete search history.

(56) References Cited

U.S. PATENT DOCUMENTS

| | | |
|---|---|---|
| 2006/0134520 A1 | 6/2006 | Ishii et al. |
| 2007/0072062 A1* | 3/2007 | Fukui ............... H01M 50/528 429/161 |
| 2009/0194747 A1 | 8/2009 | Zou et al. |
| 2010/0266882 A1 | 10/2010 | Igarashi et al. |
| 2014/0072874 A1* | 3/2014 | Kim .................... H01M 4/366 427/126.3 |
| 2014/0225031 A1* | 8/2014 | Yasuda ................. C01G 53/50 252/182.1 |
| 2014/0255796 A1 | 9/2014 | Matsuoka et al. |
| 2015/0089798 A1 | 4/2015 | Tamura et al. |
| 2015/0372349 A1 | 12/2015 | Shikita |
| 2018/0277887 A1* | 9/2018 | Yasumiishi ......... H01M 4/5825 |

FOREIGN PATENT DOCUMENTS

| | | |
|---|---|---|
| JP | 9-306502 A | 11/1997 |
| JP | 2938430 B1 | 8/1999 |
| JP | 2001-35495 A | 2/2001 |
| JP | 2001-273895 A | 10/2001 |
| JP | 3540097 B2 | 7/2004 |
| JP | 3717783 B2 | 11/2005 |
| JP | 2006-173049 A | 6/2006 |
| JP | 2010-67436 A | 3/2010 |
| JP | 2011-28898 A | 2/2011 |
| JP | 2011-511402 A | 4/2011 |
| JP | 2015-69951 A | 4/2015 |
| JP | 2015-144108 A | 8/2015 |
| JP | 2017-107827 A | 6/2017 |
| WO | 2009/063907 A1 | 5/2009 |
| WO | 2013/062056 A1 | 5/2013 |
| WO | 2014/115690 A1 | 7/2014 |
| WO | 2015/146649 A1 | 10/2015 |

OTHER PUBLICATIONS

Wang et al., "Superconcentrated electrolytes for a high-voltage lithium-ion battery", Nature Communications, 2016, 7:12032 DOI: 10.1038/ncomms12032, 9 pages.

* cited by examiner

POSITIVE ELECTRODE, NONAQUEOUS ELECTROLYTE ENERGY STORAGE DEVICE, METHOD OF PRODUCING POSITIVE ELECTRODE, AND METHOD OF PRODUCING NONAQUEOUS ELECTROLYTE ENERGY STORAGE DEVICE

TECHNICAL FIELD

The present invention relates to a positive electrode, a nonaqueous electrolyte energy storage device, a method of producing a positive electrode, and a method of producing a nonaqueous electrolyte energy storage device.

BACKGROUND ART

Nonaqueous electrolyte secondary batteries typified by lithium ion secondary batteries are widely used for electronic devices such as personal computers and communication terminals, automobiles and the like because these secondary batteries have a high energy density. The nonaqueous electrolyte secondary battery generally includes an electrode assembly having a pair of electrodes electrically separated from each other with a separator, and includes a nonaqueous electrolyte interposed between the electrodes, and the secondary battery is configured to allow ions to be transferred between both the electrodes for charge-discharge. Capacitors such as a lithium ion capacitor and an electric double layer capacitor are also widely used as nonaqueous electrolyte energy storage devices other than the secondary battery.

For a positive electrode of such a nonaqueous electrolyte energy storage device, a positive electrode in which a positive composite layer containing a positive active material is stacked on a conductive substrate is widely used. As the positive active material, a lithium transition metal composite oxide and the like are known, and a positive active material containing nickel such as a lithium-nickel composite oxide is also employed (see Patent Document 1).

PRIOR ART DOCUMENT

Patent Document

Patent Document 1: JP-A-2017-107827

SUMMARY OF THE INVENTION

Problems to be Solved by the Invention

The above positive electrode may be stored for a certain period after production. On the other hand, in order to increase the energy density of the nonaqueous electrolyte energy storage device, a positive composite with higher density is preferred. Under such circumstances, the inventors have found that when the positive active material contains nickel and the density of the positive composite is high, there is a disadvantage that electric resistance of the positive electrode tends to increase with storage.

The present invention has been made in view of the above-described situations, and an object of the present invention is to provide a positive electrode in which an increase in resistance after storage is suppressed, although the positive electrode has a high-density positive composite, a method of producing the positive electrode, a nonaqueous electrolyte energy storage device including the positive electrode, and a method of producing the nonaqueous electrolyte energy storage.

Means for Solving the Problems

A positive electrode according to one aspect of the present invention made to solve the above problem is a positive electrode for a nonaqueous electrolyte energy storage device, including a positive composite having a density of 3.1 $g/cm^3$ or more, in which the positive composite contains a positive active material containing nickel and a reducing organic acid.

The nonaqueous electrolyte energy storage device according to one aspect of the present invention is a nonaqueous electrolyte energy storage device including the positive electrode.

A method of producing a positive electrode according to one aspect of the present invention is a method of producing a positive electrode for a nonaqueous electrolyte energy storage device, including forming a positive composite, having a density of 3.1 $g/cm^3$ or more, with a positive composite paste, in which the positive composite paste contains a positive active material containing nickel and a reducing organic acid.

A method of producing a nonaqueous electrolyte energy storage device according to another aspect of the present invention is a method of producing a nonaqueous electrolyte energy storage device including the method of producing a positive electrode.

Advantages of the Invention

The present invention can provide a positive electrode in which an increase in resistance after storage is suppressed, although the positive electrode has a high-density positive composite, a method of producing the positive electrode, a nonaqueous electrolyte energy storage device including the positive electrode, and a method of producing the nonaqueous electrolyte energy storage.

MODE FOR CARRYING OUT THE INVENTION

Figure 1:
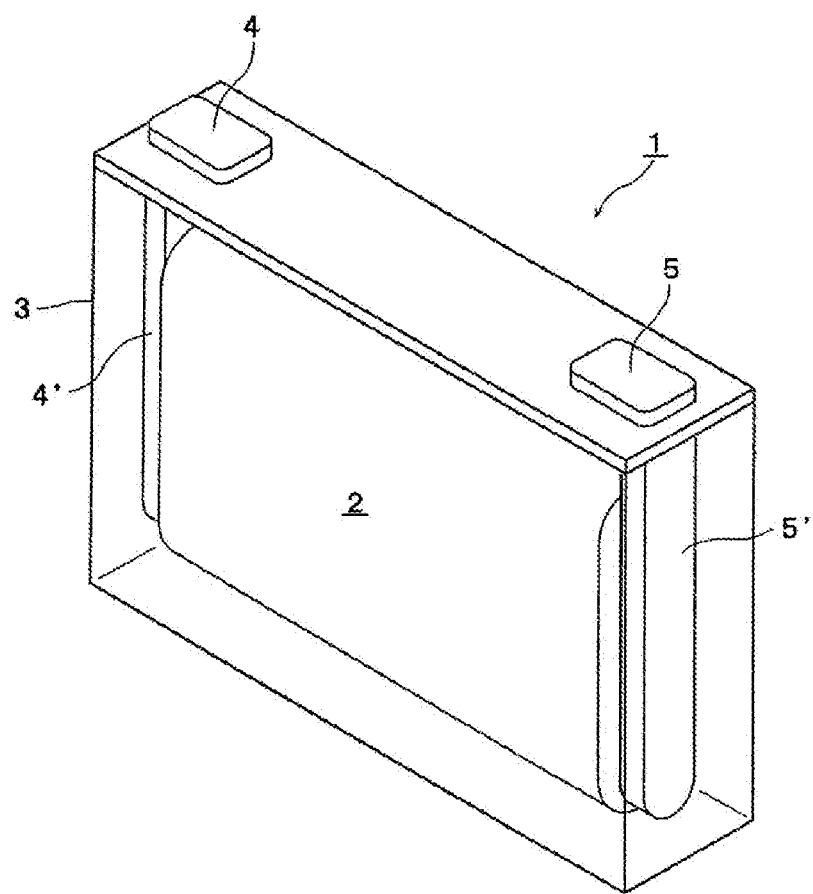
FIG. 1 is an external perspective view showing a nonaqueous electrolyte secondary battery according to an embodiment of the present invention.

One aspect of the present invention is a positive electrode for a nonaqueous electrolyte energy storage device, including a positive composite having a density of 3.1 $g/cm^3$ or more, in which the positive composite contains a positive active material containing nickel and a reducing organic acid.

Although the positive electrode has a high-density positive composite, an increase in resistance after storage is suppressed. The reason for this is not clear, but the following can be surmised. The positive active material containing nickel has a large amount of an alkali component. On the other hand, in the positive electrode, a metal foil such as aluminum is generally widely used as a conductive substrate on which the positive composite is stacked. When such a conventional positive electrode is stored, the alkali component is eluted into moisture during storage, and the substrate may be corroded (dissolved). Corrosion of the substrate causes an increase in electric resistance of the positive electrode due to a decrease in adhesion to the positive composite and the like. In particular, when the positive composite has a high density, an alkali concentration is high, so that corrosion is likely to occur. During storage, the substrate reacts with oxygen in the atmosphere to form an oxidized surface film, and insulating properties of a substrate surface increase, which are also assumed to cause an increase in resistance of the positive electrode. In contrast to such a conventional positive electrode, in the present positive electrode, it is assumed that since the positive composite contains a reducing organic acid, the alkali component is neutralized, and the reducing organic acid can be oxidized instead of oxidation (dissolution) of the substrate, so that corrosion of the substrate which is likely to occur due to the alkali component is suppressed. It is further assumed that the action of the reducing organic acid as a reducing agent can suppress the oxidation of the substrate that enhances the insulating properties. It is assumed that such an action suppresses the increase in the resistance after storage according to the positive electrode.

The "density" of the positive composite refers to a value obtained by dividing the mass of the positive composite by an apparent volume of the positive composite. The apparent volume refers to a volume including a void portion, and can be obtained as a product of the thickness and the area of the positive composite when the positive composite has a layer shape.

The reducing organic acid is preferably carboxylic acid. By using a carboxylic acid as the reducing organic acid, the effect of suppressing the increase in the resistance after storage is enhanced.

The carboxylic acid is preferably at least one selected from the group consisting of formic acid, oxalic acid, citric acid, malonic acid, lactic acid, tartaric acid, and gallic acid. By using such a carboxylic acid, the effect of suppressing the increase in the resistance after storage is further enhanced.

The content of nickel in a transition metal in the positive active material is preferably 33 mol % or more. As described above, when a positive active material having a high nickel content is used, the amount of the alkali component in the positive composite increases, and there is a tendency that the increase in the resistance due to corrosion of the substrate and the like is likely to occur. Accordingly, when the content of nickel in the transition metal in the positive active material is 33 mol % or more, the advantage of the present invention that the increase in the resistance after storage is suppressed is more effectively obtained. The term "transition metal" refers to an element that is present between group 3 elements and group 11 elements in a periodic table.

The content of the reducing organic acid is preferably 0.01 parts by mass or more and 0.1 parts by mass or less based on 100 parts by mass of the positive active material. By setting the content of the reducing organic acid within the above range, the increase in the resistance after storage is further suppressed.

One aspect of the present invention is a nonaqueous electrolyte energy storage device (hereinafter, simply referred to as "energy storage device") including the positive electrode. In the energy storage device, the increase in the resistance of the positive electrode is suppressed.

One aspect of the present invention is a method of producing a positive electrode for a nonaqueous electrolyte energy storage device, including forming a positive composite having a density of 3.1 g/cm$^3$ or more, in which the positive composite paste contains a positive active material containing nickel and a reducing organic acid. According to the production method, it is possible to obtain a positive electrode in which the increase in the resistance after storage is suppressed.

One aspect of the present invention is a method of producing a nonaqueous electrolyte energy storage device including the method of producing a positive electrode. According to the production method, it is possible to obtain an energy storage device in which the increase in the resistance of the positive electrode is suppressed.

Hereinafter, as an embodiment of the present invention, a positive electrode, an energy storage device, and a method of producing these will be described in order.

<Positive Electrode>

The positive electrode according to an embodiment of the present invention has a conductive substrate and a positive composite layer stacked on the substrate.

(Positive Substrate)

The positive substrate has conductivity. As the material of the substrate, a metal such as aluminum, titanium, tantalum, or stainless steel, or an alloy thereof is used. Among these materials, aluminum and an aluminum alloy are preferred for the balance among the potential resistance, conductivity level, and cost. Exemplified as a form of the positive substrate are a foil and a deposited film, and a foil is preferred in terms of costs. That is, an aluminum foil is preferred as the positive substrate. Examples of aluminum and the aluminum alloy include A1085P and A3003P specified in JIS-H-4000 (2014). In the present specification, having "conductivity" means having a volume resistivity of $10^7$ Ω·cm or less that is measured in accordance with JIS-H-0505 (1975).

(Positive Composite Layer)

The positive composite layer is a layer formed of a positive composite. The positive composite contains a positive active material containing nickel and a reducing organic acid. The positive composite may contain optional components such as a conductive agent, a binder (binding agent), a thickener, and a filler as necessary.

Examples of the positive active material containing nickel include lithium transition metal composite oxides such as Li[Li$_x$Ni$_{1-x}$]O$_2$ (0≤x<0.5), Li[Li$_x$Ni$_\alpha$Co$_{(1-x-\alpha)}$]O$_2$ (0≤x<0.5, 0<α<1), and Li[Li$_x$Ni$_\alpha$Mn$_\beta$Co$_{(1-x-\alpha-\beta)}$]O$_2$ (0≤x<0.5, 0<α, 0<β, 0.5<α+β<1) each having a layered α-NaFeO$_2$-type crystal structure. Examples thereof may further include polyanion such as LiNiPO$_4$. In the positive composite layer, one of these compounds may be used singly or two or more of these compounds may be mixed and used.

The lower limit of the content of nickel in the transition metal in the nickel-containing positive active material is preferably 33 mol %, and more preferably 50 mol %. On the other hand, the upper limit of the content may be 100 mol % or 70 mol %.

The lower limit of the content of the nickel-containing positive active material in the positive composite layer is preferably 70% by mass, more preferably 80% by mass, and still more preferably 85% by mass. On the other hand, the upper limit of the content of the nickel-containing positive active material is preferably 99% by mass, and more preferably 95% by mass. By setting the content of the nickel-containing positive active material within the above range, an electric capacity of the energy storage device can be increased.

The positive composite layer may further contain a positive active material other than the nickel-containing positive active material. As such a positive active material containing no nickel, a conventionally known positive active material can be appropriately used.

The reducing organic acid refers to an organic acid having a reducing property. The reducing property refers to a property of reducing other substances.

Examples of the reducing organic acid include a carboxylic acid having a reducing property ascorbic acid, and erythorbic acid, and the carboxylic acid having a reducing property is preferred.

Examples of the carboxylic acid having a reducing property include aliphatic carboxylic acids such as formic acid, oxalic acid, citric acid, malonic acid, lactic acid, and tartaric acid, and aromatic carboxylic acids such as gallic acid. Among these, aliphatic carboxylic acids are preferred, formic acid, oxalic acid and citric acid are more preferred, and citric acid is still more preferred. These reducing organic acids have appropriate acidity and reducibility, and can more sufficiently exhibit the effect of suppressing the increase in the resistance after storage. Hydroxycarboxylic acids (carboxylic acids having a hydroxy group) such as citric acid and lactic acid are also preferable. One or two or more of the reducing organic acids can be used.

The lower limit of the content of the reducing organic acid is preferably 0.01 parts by mass, more preferably 0.02 parts by mass, still more preferably 0.03 parts by mass, even more preferably 0.04 parts by mass, and further more preferably 0.05 parts by mass, based on 100 parts by mass of the nickel-containing positive active material. By setting the content of the reducing organic acid to be equal to or more than the lower limit, the increase in the resistance can be further suppressed. On the other hand, the upper limit of the content of the reducing organic acid is preferably 0.1 parts by mass, and more preferably 0.08 parts by mass. Even when the content of the reducing organic acid exceeds the upper limit, the effect tends to reach a plateau, and the production cost can be suppressed by setting the content to be equal to or less than the upper limit.

The conductive agent is not particularly limited as long as it is a conductive material that does not adversely affect the energy storage device performance. Examples of such a conductive agent include carbon blacks such as natural or artificial graphite, furnace black, acetylene black, and ketjen black, metal, and conductive ceramic. Examples of the shape of the conductive agent include a powdery shape and a fibrous shape.

Examples of the binder (binding agent) include thermoplastic resins such as fluororesins (polytetrafluoroethylene (PTFE), polyvinylidene fluoride (PVDF), vinylidene fluoride-hexafluoropropylene copolymer, tetrafluoroethylene-hexafluoropropylene copolymer, and the like), polyethylene, polypropylene and polyimide; elastomers such as ethylene-propylene-diene rubber (EPDM), sulfonated EPDM, styrene butadiene rubber (SBR) and fluorine rubber; and polysaccharide polymers.

It may be preferable that the binder have substantially no rubber elasticity. A binder having rubber elasticity usually has a three-dimensional network structure and has elasticity at a glass-transition temperature or higher. It may be preferable that the binder be other than N-methoxymethylated nylon. Among these binders, a fluororesin is preferred, and PVDF is more preferred.

Examples of the thickener include polysaccharide polymers such as carboxymethylcellulose (CMC) and methylcellulose. When the thickener has a functional group reactive with lithium, it is preferable to deactivate the functional group by methylation or the like in advance.

The filler is not particularly limited as long as it is a filler that does not adversely affect the energy storage device performance. Examples of the main component of the filler include polyolefins such as polypropylene and polyethylene, silica, alumina, zeolite and glass.

An average thickness of the positive composite layer is not particularly limited, but may be, for example, 30 μm or more and 200 μm or less.

The lower limit of the density of the positive composite layer (positive composite) is 3.1 $g/cm^3$. In the positive electrode, it is possible to suppress the increase in the resistance after storage which is usually likely to occur when the density of the positive composite layer is high as described above. Since the density of the positive composite layer is high as described above, an energy density of the energy storage device can be increased. The upper limit of the density is preferably 4 $g/cm^3$, and more preferably 3.4 $g/cm^3$. The density of the positive composite layer can be adjusted by the particle size and particle size distribution of a component such as the positive active material, pressing in a production process, and the like. For example, by using a mixture of a plurality of types of positive active materials having different particle sizes, the density of the positive composite layer to be formed can be increased.

<Nonaqueous Electrolyte Energy Storage Device>

The energy storage device according to an embodiment of the present invention has a positive electrode, a negative electrode, and a nonaqueous electrolyte. Hereinafter, a secondary battery will be described as an example of an energy storage device. The positive electrode and the negative electrode usually form an electrode assembly stacked or wound with a separator interposed therebetween. The electrode assembly is housed in a case, and the case is filled with the nonaqueous electrolyte. The nonaqueous electrolyte is interposed between the positive electrode and the negative electrode. As the case, a known metal case, a resin case or the like, which is usually used as a case of a secondary battery can be used.

(Positive Electrode)

The positive electrode included in the secondary battery is the positive electrode according to one embodiment of the present invention described above.

(Negative Electrode)

The negative electrode has a negative substrate and a negative composite layer disposed directly or via an intermediate layer on the negative substrate.

As the material of the negative substrate, metals such as copper, nickel, stainless steel, and nickel-plated steel or alloys thereof are used, and copper or a copper alloy is preferred. That is, a copper foil is preferred as the negative substrate. Examples of the copper foil include rolled copper foils and electrolytic copper foils.

The negative composite layer is formed from a so-called negative composite containing a negative active material. The negative composite that forms the negative composite layer contains optional components such as a conductive agent, a binder (binding agent), a thickener and a filler as necessary. As regards the optional component such as a conducting agent, a binding agent, a thickener, or a filler, it is possible to use the same component as in the positive composite layer.

As the negative active material, a material capable of absorbing and releasing lithium ions is normally used. Specific examples of the negative active material include metals or metalloids such as Si and Sn; metal oxides or metalloid oxides such as an Si oxide and an Sn oxide; a polyphosphoric acid compound; and carbon materials such as graphite and non-graphitic carbon (easily graphitizable carbon or hardly graphitizable carbon).

In addition, the negative composite layer may also contain a typical nonmetal element such as B, N, P, F, Cl, Br, or I, a typical metal element such as Li, Na, Mg, Al, K, Ca, Zn, Ga, or Ge, or a transition metal element such as Sc, Ti, V Cr, Mn, Fe, Co, Ni, Cu, Mo, Zr, Ta, Hf, Nb, or W.

(Separator)

The separator serves to isolate the positive electrode and the negative electrode and hold a nonaqueous electrolyte. As a material of the separator, for example, a woven fabric, a nonwoven fabric, a porous resin film or the like is used. Among them, a porous resin film is preferred. As a main component of the porous resin film, for example, a polyolefin such as polyethylene or polypropylene is preferred from the viewpoint of strength. A porous resin film in which these resins are combined with a resin such as aramid or polyimide may be used.

(Nonaqueous Electrolyte)

The nonaqueous electrolyte includes a nonaqueous solvent and an electrolyte salt dissolved in the nonaqueous solvent. The nonaqueous electrolyte may contain other additives.

As the nonaqueous solvent, a known nonaqueous solvent that is normally used as a nonaqueous solvent of a common nonaqueous electrolyte for an energy storage device can be used. Examples of the nonaqueous solvent include cyclic carbonate, linear carbonate, esters, ethers, amides, sulfone, lactones and nitriles. Among these nonaqueous solvents, it is preferable to use at least cyclic carbonate or chain carbonate, and it is more preferable to use cyclic carbonate and chain carbonate in combination. When cyclic carbonate and chain carbonate are used in combination, a volume ratio of the cyclic carbonate and the chain carbonate (cyclic carbonate: chain carbonate) is not particularly limited, and is preferably for example, 5:95 or more and 50:50 or less.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate and 1,2-diphenylvinylene carbonate.

Examples of the chain carbonate include diethyl carbonate (DEC), dimethyl carbonate (DMC), ethyl methyl carbonate (EMC) and diphenyl carbonate.

As the electrolyte salt, a known electrolyte salt that is normally used as an electrolyte salt of a common nonaqueous electrolyte for an energy storage device can be used. Examples of the electrolyte salt include lithium salts, sodium salts, potassium salts, magnesium salts and onium salts, with lithium salts being preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a fluorinated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$.

As the nonaqueous electrolyte described above, a salt that is melted at normal temperature, an ionic liquid, a polymer solid electrolyte, or the like can also be used.

<Method of Producing Positive Electrode>

The method of producing a positive electrode according to one embodiment of the present invention is a method of producing a positive electrode for a nonaqueous electrolyte energy storage device, including forming a positive composite, having a density of 3.1 g/cm$^3$ or more, with a positive composite paste, in which the positive composite paste contains a positive active material containing nickel and a reducing organic acid.

By mixing the nickel-containing positive active material and the reducing organic acid, a positive composite paste is obtained. A preferred range of the amount of the reducing organic acid added to (mixed with) the nickel-containing positive active material is the same as the preferred range of the content the reducing organic acid with respect to the nickel-containing positive active material in the positive composite layer (positive composite) described above. The positive composite paste is applied directly or via an intermediate layer to a surface of the positive substrate, and dried to obtain a positive electrode. The positive composite paste may contain optional components that may be contained in the positive composite, in addition to the materials described above.

For the positive composite paste, an organic solvent is normally used as a dispersion medium. Examples of the organic solvent include polar solvents such as N-methyl-2-pyrrolidone (NMP), acetone and ethanol, and nonpolar solvents such as xylene, toluene and cyclohexane.

The method for applying the positive composite paste is not particularly limited, and the positive composite paste can be applied by a known method such as roller coating, screen coating or spin coating. After applying or drying, the positive composite layer may be pressed in a thickness direction by a known method. As described above, the density of the positive composite layer can be increased by pressing the positive composite layer.

<Method of Producing Nonaqueous Electrolyte Energy Storage Device>

The method of producing a nonaqueous electrolyte energy storage device according to one embodiment of the present invention is a method of producing a nonaqueous electrolyte energy storage device including the method of producing a positive electrode.

In this production method, a conventional production method can be used except that a positive electrode is obtained by the above production method. The production method includes, for example, in addition to a step of preparing a positive electrode, a step of preparing a negative electrode, a step of preparing a nonaqueous electrolyte, a step of forming an electrode assembly in which the positive electrode and the negative electrode are alternately superposed by stacking or winding the positive electrode and the negative electrode with a separator interposed between the electrodes, a step of housing the positive electrode and the negative electrode (electrode assembly) in a battery case, and a step of injecting the nonaqueous electrolyte into the battery case. A nonaqueous electrolyte secondary battery (nonaqueous electrolyte energy storage device) can be obtained by sealing an injection port after the injection. The details of each element constituting the nonaqueous electrolyte energy storage device (secondary battery) obtained by the production method are as described above.

Other Embodiments

The present invention is not limited to the aforementioned embodiments, and, in addition to the aforementioned embodiments, can be carried out in various modes with alterations and/or improvements being made. For example, it is not necessary to provide an intermediate layer in the positive electrode or the negative electrode. In the positive electrode, the positive composite is not required to form a distinct layer. For example, the positive electrode may have a structure in which a positive composite is carried on a mesh-shaped positive substrate.

In the above-described embodiment, an embodiment in which the nonaqueous electrolyte energy storage device is a nonaqueous electrolyte secondary battery has been mainly described, but the nonaqueous electrolyte energy storage device may be one other than a nonaqueous electrolyte secondary battery. Examples of another nonaqueous electrolyte energy storage device include capacitors (electric double layer capacitors and lithium ion capacitors).

FIG. 1 is a schematic view of a rectangular nonaqueous electrolyte secondary battery 1 (secondary battery 1) as one embodiment of the nonaqueous electrolyte energy storage device according to the present invention. FIG. 1 is a view showing an inside of a case in a perspective manner. In the secondary battery 1 shown in FIG. 1, an electrode assembly 2 is housed in a battery case 3. The electrode assembly 2 is formed by winding a positive electrode, including a positive active material, and a negative electrode, including a negative active material, with a separator interposed between the electrodes. The positive electrode is electrically connected to a positive electrode terminal 4 through a positive electrode lead 4', and the negative electrode is electrically connected to a negative electrode terminal 5 through a negative electrode lead 5'. A nonaqueous electrolyte is injected in the battery case 3. The specific configuration of each element such as the positive electrode is as described above.

Figure 2:
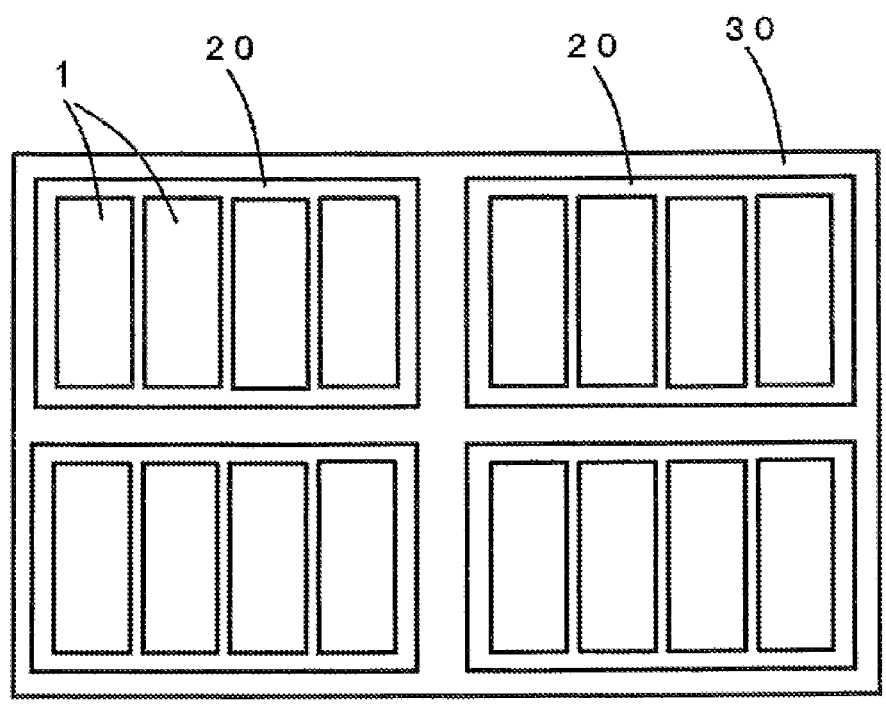
FIG. 2 is a schematic diagram showing an energy storage apparatus including a plurality of the nonaqueous electrolyte secondary batteries according to an embodiment of the present invention.

The configuration of the nonaqueous electrolyte energy storage device according to the present invention is not particularly limited, and examples include cylindrical batteries, prismatic batteries (rectangular batteries) and flat batteries. The present invention can also be implemented as an energy storage apparatus including a plurality of the nonaqueous electrolyte energy storage devices as described above. FIG. 2 shows one embodiment of an energy storage apparatus. In FIG. 2, an energy storage apparatus 30 includes a plurality of energy storage units 20. Each of the energy storage units 20 includes a plurality of the secondary batteries 1. The energy storage apparatus 30 can be mounted as a power source for an automobile such as an electric vehicle (EV), a hybrid vehicle (HEV), a plug-in hybrid vehicle (PHEV), or the like.

EXAMPLES

Hereinafter, the present invention will be described further in detail by way of examples, but the present invention is not limited to the following examples.

Example 1

(Positive Electrode)
A positive composite paste was prepared using LiNi$_{1/3}$Mn$_{1/3}$Co$_{1/3}$O$_2$ as a positive active material, citric acid as a reducing organic acid, acetylene black (AB) as a conductive agent, polyvinylidene fluoride (PVDF) as a binding agent, and N-methylpyrrolidone (NMP) as a dispersion medium. A mass ratio of the positive active material, the binding agent, and the conductive agent was 90.5:4.5:5.0 (solid content conversion). The content of citric acid was 0.04 parts by mass based on 100 parts by mass of the positive active material. The prepared positive composite paste was intermittently applied to both surfaces of an aluminum foil (16 µm thick) as a positive substrate, except for a portion where no positive composite layer was formed, and dried to prepare a positive composite layer. Thereafter, a surface of the positive composite layer was roll-pressed to obtain a positive electrode. The thickness of the obtained positive electrode was 140 µm, and the density of the positive composite (positive composite layer) was 3.1 g/cm$^3$.

Examples 2 to 5, Comparative Examples 1 to 6

A positive electrode of each of Examples 2 to 5 and Comparative Examples 1 to 6 was obtained in the same manner as in Example 1, except that the type and content of organic acid (reducing organic acid or other organic acid) and the density of the positive composite were set as shown in Tables 1 and 2. The density of the positive composite was adjusted by appropriately changing a pressing pressure on the surface of the positive composite layer. The maleic acid in Table 2 is an organic acid having no reducing property.
[Evaluation]
(Measurement of Surface Resistance Before Storage)
For each positive electrode produced as described above, resistance of a composite layer surface was measured under an environment at 25° C. and a dew point of 0° C. or lower using a surface resistance meter ("LORESTA-FP" manufactured by Mitsubishi Chemical Corporation, using a four-probe MCP-TESTER as a probe).
(Measurement 1 of Surface Resistance after Storage)
Each of the positive electrodes of Examples 1 and 2 and Comparative Examples 1 to 4 whose surface resistance before storage was measured was stored for two weeks in an environment at a temperature of 30° C. and a relative humidity of 55%. For each positive electrode after storage, the surface resistance was measured in the same manner as in the above "Measurement of surface resistance before storage". Table 1 shows a percentage of a surface resistance value after storage with respect to the surface resistance value before storage as a surface resistance increase rate (%).
(Measurement 2 of Surface Resistance after Storage: Acceleration Test)
Each of the positive electrodes of Examples 3 to 5 and Comparative Examples 5 and 6 whose surface resistance before storage was measured was stored for two weeks in an environment at a temperature of 50° C. and a relative humidity of 75%. For each positive electrode after storage, the surface resistance was measured in the same manner as in the above "Measurement of surface resistance before storage". Table 2 shows the percentage of the surface resistance value after storage with respect to the surface resistance value before storage as the surface resistance increase rate (%).

TABLE 1

| | Organic acid | | Positive composite density (g/cm$^3$) | Surface resistance increase rate (%) |
|---|---|---|---|---|
| | Type | Content (part(s) by mass) | | |
| Comparative Example 1 | — | — | 2.4 | 98 |
| Comparative Example 2 | — | — | 3.1 | 119 |
| Comparative Example 3 | — | — | 3.3 | 117 |
| Comparative Example 4 | Critic acid | 0.04 | 2.2 | 101 |
| Example 1 | Critic acid | 0.04 | 3.1 | 106 |
| Example 2 | Critic acid | 0.04 | 3.2 | 105 |

TABLE 2

|  | Organic acid | | Positive composite density (g/cm³) | Surface resistance increase rate (%) |
| --- | --- | --- | --- | --- |
|  | Type | Content (part(s) by mass) | | |
| Comparative Example 5 | — | — | 3.3 | 886 |
| Example 3 | Critic acid | 0.03 | 3.3 | 397 |
| Example 4 | Critic acid | 0.04 | 3.3 | 355 |
| Example 5 | Critic acid | 0.06 | 3.3 | 338 |
| Comparative Example 6 | Maleic acid | 0.03 | 3.3 | 793 |

The following can be seen from the results in Table 1. Comparing Comparative Examples 1 to 3, when the density of the positive composite is 3.1 g/cm³ or more (Comparative Examples 2 and 3), the surface resistance after storage is significantly increased. In contrast, as shown in Examples 1 and 2, it can be seen that the increase in surface resistance is suppressed by adding citric acid, which is a reducing organic acid, to the positive composite having a density of 3.1 g/cm³ or more. On the other hand, as can be seen from a comparison between Comparative Example 1 and Comparative Example 4, when the density of the positive composite is less than 3.1 g/cm³, even if the positive composite contains citric acid, the effect of suppressing the increase in surface resistance is not provided. In other words, it can be seen that the effect of suppressing the increase in the resistance after storage of the positive electrode is an effect that occurs only when a reducing organic acid is added to the positive composite having a density of 3.1 g/cm³ or more.

As shown in Table 2, comparing Examples 3 to 5, it can be seen that the effect of suppressing the increase in surface resistance is increased by increasing the content of critic acid which is a reducing organic acid. On the other hand, in Comparative Example 7 using maleic acid which is an organic acid having no reducing property the effect of suppressing the increase in surface resistance hardly occurs. From these results, it can be seen that the effect of suppressing the increase in the resistance after storage of the positive electrode is an effect that occurs only by using an additive having both acidity and reducibility.

INDUSTRIAL APPLICABILITY

The present invention can be applied to nonaqueous electrolyte energy storage devices including nonaqueous electrolyte secondary batteries to be used as power sources for electronic devices such as personal computers and communication terminals, automobiles and the like.

DESCRIPTION OF REFERENCE SIGNS

1: Nonaqueous electrolyte secondary battery
2: Electrode assembly
3: Battery case
4: Positive electrode terminal
4': Positive electrode lead
5: Negative electrode terminal
5': Negative electrode lead
20: Energy storage unit
30: Energy storage apparatus

The invention claimed is:

1. A positive electrode for a nonaqueous electrolyte energy storage device, comprising a positive composite having a density of 3.1 g/cm³ or more and 4 g/cm³ or less, wherein the positive composite contains a positive active material containing nickel and citric acid, the positive active material containing nickel includes at least one lithium transition metal composite oxide having a layered α-NaFeO2-type crystal structure, which is selected from a group consisting of Li[Li$_x$Ni$_{1-x}$]O$_2$ (0≤x<0.5), Li[Li$_x$Ni$_\alpha$Co$_{(1-x-\alpha)}$]O$_2$ (0≤x<0.5, 0<α<1) and Li[Li$_x$Ni$_\alpha$Mn$_\beta$Co$_{(1-x-\alpha-\beta)}$]O$_2$ (0≤x<0.5, 0<α, 0<β, 0.5<α+β<1), a content of nickel in a transition metal in the positive active material is 33 mol % or more and 70 mol % or less, a content of the citric acid is 0.01 parts by mass or more and 0.08 parts by mass or less based on 100 parts by mass of the positive active material, a content of the positive active material in the positive composite is 70% by mass or more and 99% by mass or less, and an increase in surface resistance of the positive electrode after being stored for two weeks in an environment at a temperature of 30° C. and a relative humidity of 55% is suppressed as compared to a comparative positive electrode comprising a positive composite having the density of 3.1 g/cm³ or more and 4 g/cm³ or less and containing the positive active material but not containing the citric acid, and/or an increase in surface resistance of the positive electrode after being stored for two weeks in an environment at a temperature of 50° C. and a relative humidity of 75% is suppressed as compared to the comparative positive electrode.

2. A nonaqueous electrolyte energy storage device comprising the positive electrode according to claim 1.

3. A method of producing a positive electrode for a nonaqueous electrolyte energy storage device, comprising forming a positive composite, having a density of 3.1 g/cm³ or more and 4 g/cm³ or less, with a positive composite paste, wherein the positive composite paste contains a positive active material containing nickel and citric acid, the positive active material containing nickel includes at least one lithium transition metal composite oxide having a layered α-NaFeO2-type crystal structure, which is selected from a group consisting of Li[Li$_x$Ni$_{1-x}$]O$_2$ (0≤x<0.5), Li[Li$_x$Ni$_\alpha$Co$_{(1-x-\alpha)}$]O$_2$ (0≤x<0.5, 0<α<1) and Li[Li$_x$Ni$_\alpha$Mn$_\beta$Co$_{(1-x-\alpha-\beta)}$]O$_2$ (0≤x<0.5, 0<α, 0<β, 0.5<α+β<1), a content of nickel in a transition metal in the positive active material is 33 mol % or more and 70 mol % or less, a content of the citric acid is 0.01 parts by mass or more and 0.08 parts by mass or less based on 100 parts by mass of the positive active material, a content of the positive active material in the positive composite is 70% by mass or more and 99% by mass or less, and in the positive electrode produced by the method, an increase in surface resistance after being stored for two weeks in an environment at a temperature of 30° C. and a relative humidity of 55% is suppressed as compared to a positive electrode comprising a comparative positive composite having the density of 3.1 g/cm³ or more and 4 g/cm³ or less and containing the positive active material but not containing the citric acid, and/or an increase in surface resistance of the positive electrode after being stored for two weeks in an environment at a temperature of 50° C. and a relative humidity of 75% is suppressed as compared to the comparative positive electrode.

4. A method of producing a nonaqueous electrolyte energy storage device comprising the method of producing a positive electrode according to claim 3.

5. The positive electrode according to claim 1, wherein the positive composite further contains a thickener including at least one of carboxymethylcellulose or methylcellulose.

6. The positive electrode according to claim 1, wherein the positive composite further contains a thickener having a functional group reactive with lithium, and the functional group is deactivated by methylation in advance.

7. The positive electrode according to claim 1, wherein a content of the positive active material in the positive composite is 70% by mass or more and 90.5% by mass or less.

8. The method according to claim 3, wherein a content of the positive active material in the positive composite is 70% by mass or more and 90.5% by mass or less.

9. The positive electrode according to claim 1, wherein the density of the positive composite is 3.1 g/cm$^3$ or more and 3.3 g/cm$^3$ or less.

10. The method according to claim 3, wherein the density of the positive composite is 3.1 g/cm$^3$ or more and 3.3 g/cm$^3$ or less.

11. A positive electrode for a nonaqueous electrolyte energy storage device, comprising a positive composite having a density of 3.1 g/cm$^3$ or more and 3.3 g/cm$^3$ or less,
wherein the positive composite contains a positive active material containing nickel and citric acid,
the positive active material containing nickel includes at least one lithium transition metal composite oxide having a layered α-NaFeO2-type crystal structure, which is LiNi$_{1/3}$Mn$_{1/3}$Co$_{1/3}$O$_2$,
a content of the citric acid is 0.01 parts by mass or more and 0.08 parts by mass or less based on 100 parts by mass of the positive active material,
a content of the positive active material in the positive composite is 70% by mass or more and 90.5% by mass or less, and
an increase in surface resistance of the positive electrode after being stored for two weeks in an environment at a temperature of 30° C. and a relative humidity of 55% is suppressed as compared to a comparative positive electrode comprising a positive composite having the density of 3.1 g/cm$^3$ or more and 3.3 g/cm$^3$ or less and containing the positive active material but not containing the citric acid, and/or an increase in surface resistance of the positive electrode after being stored for two weeks in an environment at a temperature of 50° C. and a relative humidity of 75% is suppressed as compared to the comparative positive electrode.

12. The positive electrode according to claim 1, further comprising a substrate selected from a group consisting of aluminum, titanium, tantalum, stainless steel and an alloy thereof.

13. The positive electrode according to claim 12, wherein a positive composite layer formed of the positive composite is stacked on the substrate, and
an average thickness of the positive composite layer is 30 μm or more and 200 μm or less.

* * * * *